United States Patent
de Bellefeuille et al.

(10) Patent No.: US 6,285,932 B1
(45) Date of Patent: *Sep. 4, 2001

(54) COMPUTERIZED AUTOMOTIVE SERVICE SYSTEM

(75) Inventors: Jean de Bellefeuille, Brunswick, ME (US); Steven Wade Rogers, Conway, AR (US); George Michael Gill, Vilonia, AR (US); Michael John Kling, III, Little Rock, AR (US); Michael Lloyd Baird, Los Altos, CA (US); Alan David Casby, Conway, AR (US); Patrick B. O'Mahony, Cork City; John C. Brennan, Carrigrohane, both of (IE); Ju Zheng, Little Rock, AR (US); Gary L. Sandusky, Prosper, TX (US)

(73) Assignee: Snap-On Technologies, Inc., Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,725

(22) Filed: May 16, 1997

(51) Int. Cl.⁷ .............................. G06F 19/00; G01B 7/315
(52) U.S. Cl. .................................. 701/33; 701/35; 701/2; 707/10
(58) Field of Search .................................. 701/2, 29, 33, 701/35; 370/313, 401; 364/551.01, 556; 340/438; 33/286, 288; 356/138, 155; 379/1; 455/423, 426; 709/107, 218, 219; 707/10, 513

(56) References Cited

U.S. PATENT DOCUMENTS

| | | |
|---|---|---|
| 4,381,548 * | 4/1983 | Grossman et al. ............. 701/29 |
| 4,404,639 | 9/1983 | McGuire et al. ............. 701/35 |
| 4,922,443 | 5/1990 | Coestsier et al. ............. 702/188 |
| 4,977,524 * | 12/1990 | Strege et al. ............. 364/528.14 |
| 5,157,610 * | 10/1992 | Asano et al. ............. 701/32 |
| 5,208,646 | 5/1993 | Rogers et al. ............. 356/139.03 |
| 5,305,455 | 4/1994 | Anschuetz et al. ............. 709/100 |
| 5,506,772 * | 4/1996 | Kubozono et al. ............. 701/29 |
| 5,602,733 * | 2/1997 | Rogers et al. ............. 701/29 |
| 5,657,233 | 8/1997 | Cherrington et al. ............. 705/400 |
| 5,713,075 * | 1/1998 | Threadgill et al. ............. 455/427 |
| 5,732,074 * | 3/1998 | Spaur et al. ............. 370/313 |

FOREIGN PATENT DOCUMENTS

| | | |
|---|---|---|
| 0 644 501 | 3/1995 | (EP) . |
| 2 305 818 | 4/1997 | (GB) . |

OTHER PUBLICATIONS

Hunter Engineering Company Form No. 2645T, "Operation Instructions System B400 Brake Tester", published Dec. 1992.*

Hunter Engineering Company Product Literature, entitled "What makes the System H111 Wheel Aligner A Better Value?", Hunter Form No. 2618T, dated 9/89.

Hypertext Transfer Protocol—HTTP/1.1 Standards, pp. 1–10 of 114, available on-line at http://www.w3.org/Protocols/HTTP/1.1/rfc2616.pdf (dated 6/99).

(List continued on next page.)

Primary Examiner—Tan Nguyen
(74) Attorney, Agent, or Firm—McDermott, Will & Emery

(57) ABSTRACT

The present invention is directed to computerized vehicle servicing and diagnostic systems that communicate with or access remotely located computers via the Internet that have pre-stored data or utilize pre-store data and parameters. The present system provides a navigational framework with two modules, the Menu Mode (random) and the Wizard Mode (sequential). The Menu Mode provides direct access to any required process and Wizard Mode provides a flexible control of process sequences and allows for user modification.

7 Claims, 4 Drawing Sheets

OTHER PUBLICATIONS

Hypertext Transfer Protocol—HTTP/1.0 Standards, pp. 1–10 of 114, available on–line at http://www.w3.org/Protocols/HTTP/1.0/spec.txt (dated Feb. 13, 1997).

Microsoft Windows™ Win32™ Professional Developers Conference, Conference Guide, Dec. 13–17, 1993.

Tammy Steele, "Writing 32–Bit Applications for All Windows Platforms," Next Stop: Chicago, dated Nov. 29, 1999 but document may date from as early as 1994.

1.) Williams, Al, *Developing Active Web Controls*, Chapters 1 and 6–9. Coriolis Group Books, 1996.

2.) Hipson, Peter D., "Installing Your Applications Under Windows 95," Proceedings of the International Developers Conference For Windows, Book III, Chapter F1; Jun. 16, 1995.

3.) Beveridge et al., *Multithreading Applications in Win32: The Complete Guide To Threads*, Chapters 1, 10, and 14; Dec. 1996.

4.) Punders, Mark, *Installshield5: Getting Started Guide*. Installshield Software Corporation, 1997.

5.) Norton, Daniel A., *Writing Windows Device Drivers*, Chapters 1 and 7–10; 1992.

6.) *Help–To–HTML Converter: User's Guide*. Blue Sky Software Corporation, 1996.

7.) Hall, Dr. Bill, "Win32 Internationalization" and Hall et al., "Working with Japanese and Other Far East Languages," Proceedings of the International Developers Confedrence For Windows, Book I, Chapter M3; Jun. 12, 1995.

8.) Oney, Walter, "Why Port to Win32?"; Freytag, Ausmus, "How to Implement a Multilingual User Interface"; Richter, Jeffrey, "Processes and Threads"; and Freytag, Ausmus, "Setting Up and International Software Project," Proceedings of the International Developers Conference For Windows, Book II, Chapters T1, T18, and W6, respectively; Jun. 13–14, 1995.

9.) Rumbaugh et al., *Object–Oriented Modeling and Design*, Chapters 13–17. Prentice Hall, 1991.

10.) Kano, Nadine, *Developing International Software for Windows95 and Windows NT: A Handbook for International Software Design*, Chapters 1–4. Microsoft Press, 1995.

11.) Blaszczak, Mike, *The Revolutionary Guide to Win32 Programming Using Visual C++*, Chapters 3, 4, 7 and 9; 1995.

\* cited by examiner

COMPUTERIZED AUTOMOTIVE SERVICE SYSTEM

BACKGROUND AND SUMMARY OF THE INVENTION

Computerized automotive service and diagnostic equipment systems for measuring or testing various parameters and for providing maintenance or repair procedure instructions to an operator are generally known. Such systems utilize a central control processor and various data input and storage means including, for example, vehicle-mounted instrument sensors, manual data input consoles, and electronically-stored databases.

Systems that utilize vehicle-mounted instruments enable sensors or measuring devices in the instruments to provide measurement signals to a central processor for comparison with data or computation of vehicle conditions. In addition to providing input or measured data, vehicle-mounted sensors enable live or real-time monitoring of various conditions.

Measured data and operator-input data provided through, for example, a keyboard or similar means, can be compared to pre-stored data or parameters calculated from one or more of pre-stored data, measured data, or user-input data. Data and computed or measured results can be compared to known, pre-stored data for specific makes and models of vehicles or parts to identify conditions or to diagnose problems. Possible problems and conditions are pre-stored in the memory of the computer and are displayed or presented to the operator via a display screen or printer.

In addition, such systems can include step-by-step adjustment or repair procedure instructions displayed in response to measured or input data in order to guide an operator or technician through an adjustment or repair procedure.

The present invention relates to computerized vehicle servicing and diagnostic systems and, more particularly, to such systems that communicate with or access remotely located computers via the Internet that have pre-stored data or that utilize pre-stored data and parameters. A further aspect of the invention relates to utilizing the same to access remotely located computers that are interfaced with other equipment or human operators for real-time or frequently updated information.

The present invention is directed to an apparatus and method for the exchange and sharing of information on the Internet. The popularity of the Internet has promoted development of improved standards in communication technology. One such standard is "HTTP" or Hypertext Transmission Protocol. HTTP is the underlying protocol that allows information to flow through the World Wide Web of the Internet. Specifically, http allows the transfer of information between dissimilar types of computers, enabling any computer system that can process HTTP to communicate with any computer in the world that can also process HTTP, regardless of the specific computer architecture (PC, Apple, RISC, etc.), operating system (MS-DOS, Windows 95, Windows NT, Unix, etc.), or spoken language. By using HTTP equipment and inventory systems at different locations around the world can use common information databases and exchange information or share data easily. Furthermore, individuals at remote locations can communicate in real time with or direct the operations of a computer control located at a repair or service site.

The most notable characteristic of the Internet in current times is that it easily enables information to be requested and retrieved from virtually anywhere. Once a user has installed a Web browser on his computer and is connected to the Internet through an Internet service provider (ISP) he can access a Web page from any World Wide Web (WWW) server throughout the world. There is no need for special configuration or compatibility requirements because of the universal nature of the communication standards. The ability to access a select, remote location for data or programs alleviates problems associated with long development cycles for custom software, cumbersome integration of multiple service applications on a single computer, periodic updates involving CD-ROM or floppy discs, and remote diagnostic software written as an addition to the standard application but not integrated.

U.S. Pat. No. 4,404,639, issued on Sep. 13, 1983, prior to the emergence of the Internet and the World Wide Web, is directed to a communicating network of computers stationed at various service agencies and sharing various databases in order to provide service agencies with up to date data maintained in a central location. Such a network, however, is limited to users having dedicated computers and common or compatible interface hardware and software.

Another aspect of the present invention is directed to the software and manual methods for managing textual phrases used in the vehicle equipment system of the present invention, hereafter referred to as the International Language Management (ILM) system. The software extracts phrases and builds a database of the phrases, provides an editing page where target phrases for various languages may be edited for minor correction, and generates target resource files for compilation into dynamic libraries that are used by the vehicle service system to operate in any of the various language provided within the system.

A further aspect of the invention relates to implementing 32-bit software in the present invention vehicle service system for improved overall performance and compatibility with the latest developments in computer technology. In particular, the preferred embodiment of the invention utilizes Microsoft's new 32-bit Windows™ application.

Yet a further aspect of the invention is directed to a novel, flexible navigation control that allows the ability to facilitate process selection for the user so that the user may run the system from either random access or sequential progression. The required processes sometimes need to be activated individually and at other times need to follow a pre-determined sequential progression. In the past, the pre-determined sequence was hard-coded into the software and the end user could not alter it or could only alter it minimally. The present system provides a navigational framework with two modules, the Menu Mode (random) and the Wizard Mode (sequential). The Menus Mode provides direct access to any required process and Wizard Mode provides a flexible control of the process sequences and allows for user modification.

Another aspect of the present invention vehicle service system is the enhanced display of both a live gauge and pre-stored adjustment instructions for the operator or technician to simultaneously monitor measured data and perform adjustment or servicing steps on a vehicle either directly or through specialized equipment.

DESCRIPTION OF THE PREFERRED EMBODIMENT

Figure 1:
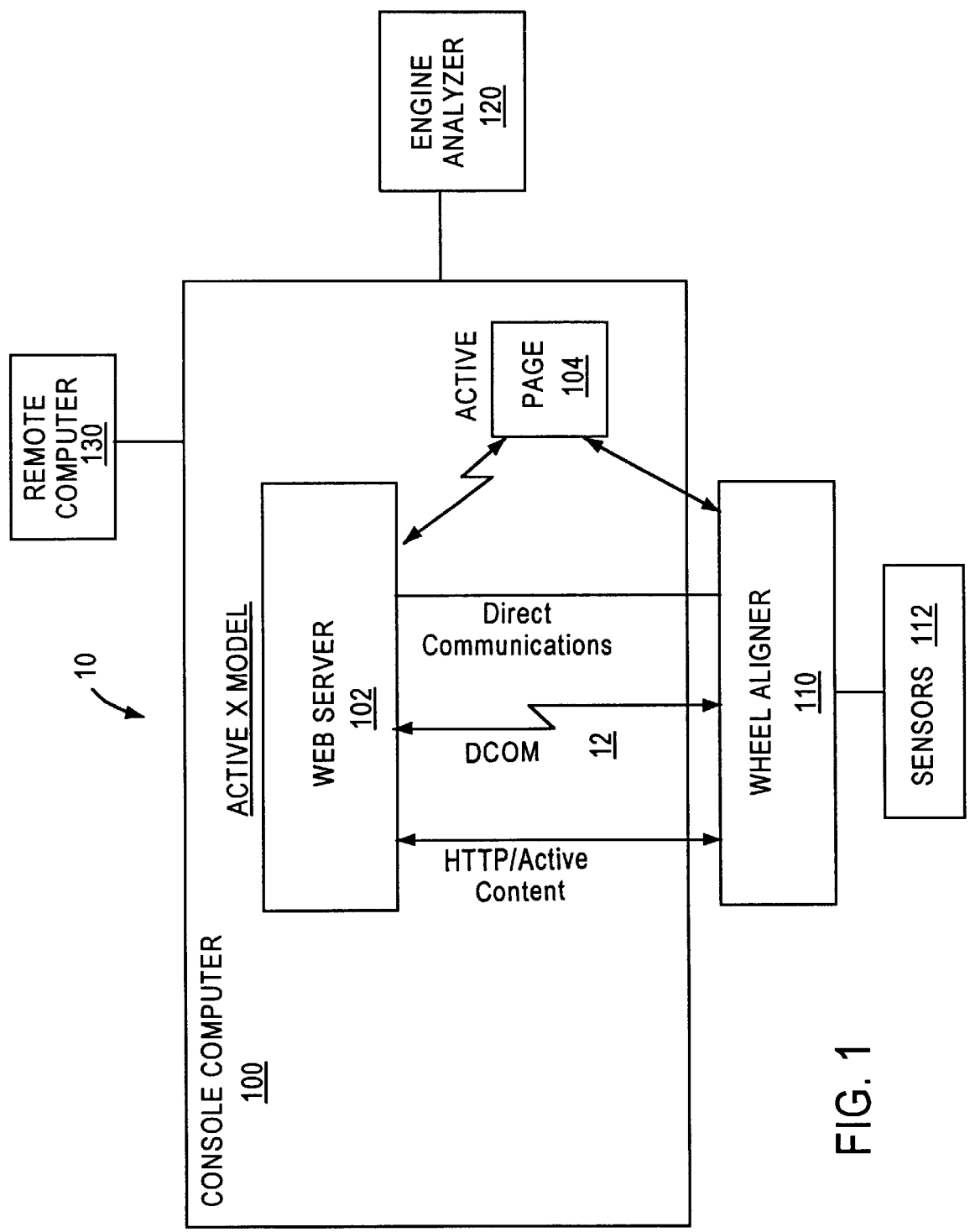
FIG. 1 is a schematic of the vehicle service system of the present invention.

The preferred embodiment of the present invention is directed to performance enhancements for computerized measuring and servicing systems for machinery, such as those disclosed in U.S. Pat. No. 4,383,370 and 5,208,646 which are both incorporated by reference herein.

Integration of an Automotive Service System Based on HyperText Transmission Protocol With reference to the preferred embodiments, a transmission control protocol (TCP) or an Internet Protocol (IP), collectively referred to as "TCP/IP," refer to a set of protocols for network operations that provide for communication between interconnected networks or computers having diverse hardware architectures and various operating systems. TCP/IP is a lower level protocol that communicates with a network card driver. The network card driver in turn communicates with the network hardware or physical layer of the protocol stack. TCP/IP supplies the source and destination address of the data. File Transfer Protocol (FTP) is an older protocol used for transferring files between different computers.

The underlying protocol that is used by clients and servers to communicate on the World Wide Web (WWW) is Hypertext Transmission Protocol (HTTP). HTTP has generally superseded FTP, which is characterized by a required logon to the remote computer and the ability to browse directories and two-way file transfer. HTTP is an application-level protocol for distributed, collaborative, hypermedia information systems. It is a generic and object-oriented protocol characterized by the typing and negotiation of data representation, allowing systems to be built independently of data being transferred. A simple markup language used to create hypertext documents that are portable from one platform to another is Hypertext Markup Language (HTML). HTML files are simple ASCII text files with codes embedded to indicate formatting and hypertext links.

The World Wide Web (WWW) has become synonymous with the Internet. The WWW, however, began as an information network project by Tim Berners-Lee at the European Laboratory for Particle Physics (CERN). The WWW refers to the software, protocols, conventions, and information that enable hypertext and multimedia publishing of resources on different computers around the world. HTML is the formatting language used for documents on the WWW. The WWW can be "surfed" or browsed using a Web browser, which is a software program that retrieves a document from a Web server, interprets HTML codes, and displays the document to the user. A document on the WWW is referred to as a Web page. A Web server is a computer equipped with the server software necessary to respond to HTTP requests, such as a request from a Web browser.

Web pages are typically constructed and stored as static files and served to a Web browser upon demand. In this case the content of the Web page cannot change as the result of any action from the Web browser. A request can be sent from the Web browser to the Web server to execute a (Common Gateway Interface) CGI script file. A CGI script is a custom program that will perform a function if executed and provided with necessary information. One example of how CGI scripts are currently used is when a CGI script enables a user to construct a Web page by passing information to the Web server. Another example is the use of CGI scripts to produce a counter for tracking the number of visits by Web browsers to a Web page. CGI scripts are separately executable files and are not part of the Web server software. They run as separate programs in a different address space from the Web server software.

A system of the present invention is specifically directed to an embodiment featuring a non-dedicated vehicle service console system 100. The system features the utilization of a single computer 100 to host more than one service system such as, for example, a combination wheel aligner 110 and engine analyzer 120. Such a combined system technically requires independent programs and independent sets of service hardware to accommodate the two functions, while sharing a common PC. While it is technically possible to design the systems to co-exist, they cannot be truly integrated.

Under the present invention, the aligner system comprises a collection of vehicle sensors 112 and a Web server 102. The Web server 102 maintains, for example, areas for storing data relating to the customer, the vehicle type, and vehicle problem information. The Web server would also maintain an area dedicated to alignment procedures, specific to both the vehicle and to the equipment for performing the alignment procedure.

The alignment procedures in the system (10) of the present invention are constructed under a group of compatible communication tools, such as Microsoft ActiveX™ technology as shown in FIG. 1. The alignment procedures utilize ActiveX™ components and controls and are located on ActiveX™ server pages 104. Preferably the sensors 112 are configured to communicate on an internal shop network or Intranet. Data from the sensors 112 is transferred to the Web server 102 with direct communication between the ActiveX™ controls in the server pages 104 and in the sensor subsystems 112. Such direct communication is accomplished through an object communication standard such as, for example, the Distributed Component Object Model (DCOM) (12) from Microsoft Corporation, enabling software on one computer to work with software on another computer. Thus, the Web server 102 running the ActiveX™ server pages 104 for the aligner 110, for example, will run even if the vehicle sensors 112 are not directly attached to the server computer 100.

International Language Management for Vehicle Service System

Figure 2:
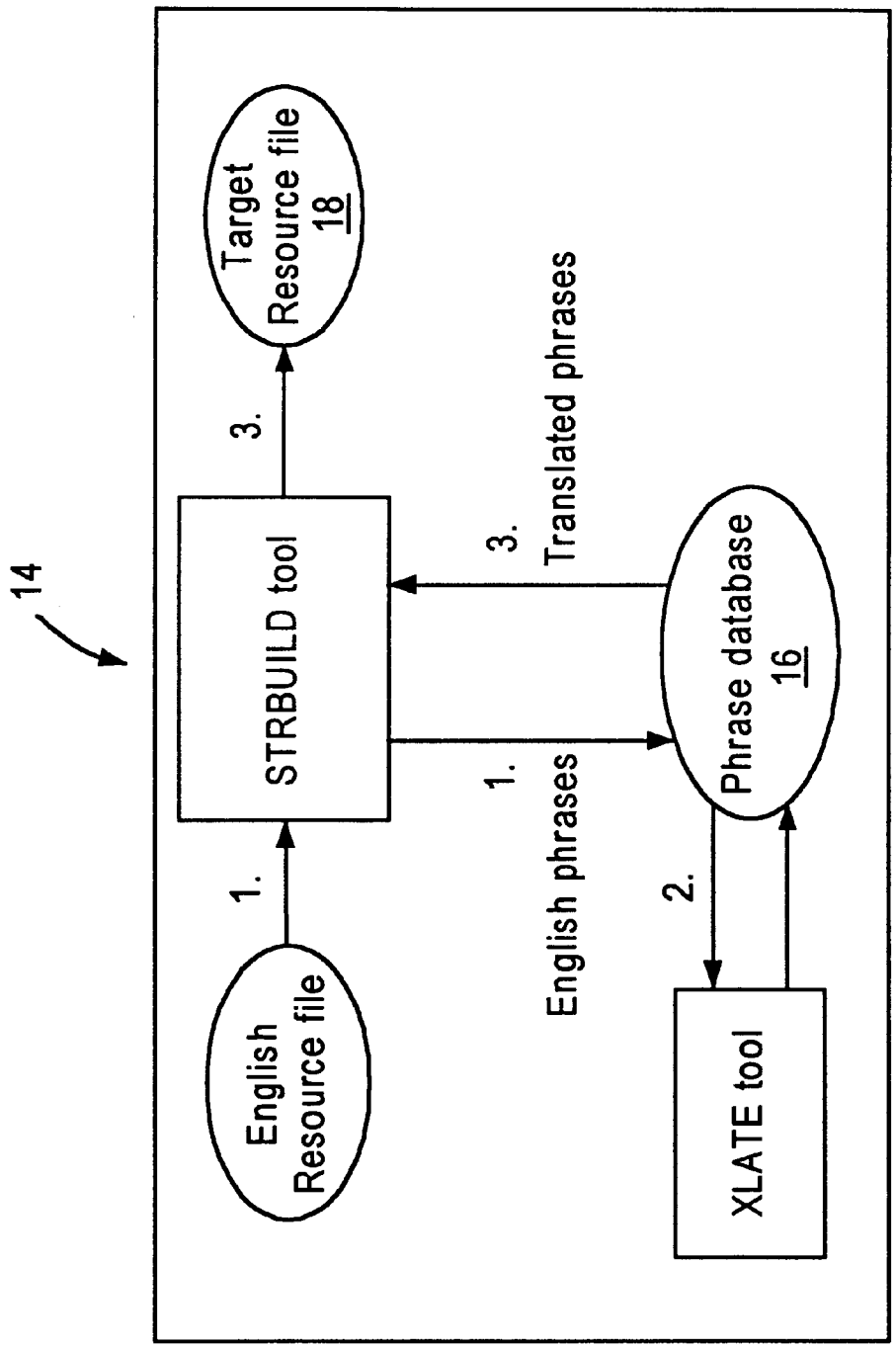
FIG. 2 is a schematic of the language management feature of the present invention vehicle service system.

Another aspect of the present invention is directed to the software and manual methods for managing textual phrases used in the vehicle equipment system of the present invention, hereafter referred to as the International Language Management (ILM) system (14), as illustrated in FIG.2. The software extracts phrases and builds a database (16) of the phrases, provides an editing page where target phrases for various languages may be edited for minor correction, and generates target resource files (18) for compilation into dynamic libraries that are used by the vehicle service system to operate in any of the various language provided within the system. The method steps to complete the management cycle comprise identifying the master English language phrase file, establishing sub-projects in the development system for the target languages, and building target resource files into the dynamic libraries. The vehicle service system uses the dynamic libraries by building an index and presenting the list to the user for selection upon demand. Synchronization of the languages is facilitated when changes to the master phrase file occur, whereby the target language phrases are inserted during editing, and the target phrase file and dynamic libraries are regenerated.

The ILM system software conforms to the design guidelines as set forth in Microsoft Corporation's Visual C++ development environment for 32-Bit Windows™ software. It uses a Microsoft database system which allows the use of the database management program ACCESS ™ to selectively inspect and edit the phrases. The software can be implemented in a dialog-based user interface, or in a multi- or single-document application. The software is capable of using other platforms such as MacIntosh or UNIX. The preferred embodiment executes on Windows-95™ or WindowsNT™, and is a 32-bit application.

The software manages a variety of international languages through its capability to decode and display the various languages required for the vehicle service system, including, but not limited to, all European single-byte languages based on ISO-Latin I and ISO-Latin II; Cyrillic, Greek, Hebrew and Arabic; Chinese, Japanese, Korean and Thai. The software is capable of processing Unicode if desired.

The advantages of the present invention ILM system include the ability to display the various languages without requiring a localized version of WindowsTM. Management required to ensure that phrase duplication in the vehicle service system is eliminated is minimal. The synchronization of languages is simplified into a three-step method of database generation and extension, phrase resource generation, and dynamic library generation.

32-Bit Software for Vehicle Service System

Another aspect of the invention relates to implementing 32-bit software in the present invention vehicle service system. In particular, the preferred embodiment of the invention utilizes Microsoft's new 32-bit Windows™ application.

Current vehicle service equipment is designed to run on the DOS platform as 16-bit applications. These 16-bit applications do not take advantage of the 32-bit architecture of the latest CPU chips, such as the 486 or the PENTIUM, and the 32-bit architecture of Windows95™ and WindowsNT™. By using the latest software tools and software design methods, vehicle service equipment applications can be improved in the following ways. For example, 32-bit applications provide an inherent speed advantage over 16-bit applications. The software executes faster on the CPU. Various functions such as integer arithmetic, function calls, and huge array access are executed more rapidly. As 32-bit systems are marketed more heavily, older 16-bit systems will receive less product support.

The vehicle service system in the preferred embodiment of the present invention is programmed to support the WIN32® application programming interface (API). This is in the form of an executable file generated with a 32-bit application generator (compiler) which generates an executable file of the Portable Executable format. The Microsoft Visual C++ compiler (version 2.0 or later), Microsoft's Visual Basic, Borland Delphi and other 32-bit application generators can be used. The vehicle service system utilizes Microsoft Foundation Classes (MFC) to reduce development time. These classes provide easier implementation of the graphical user interface (GUI), data access, and general operating system interfaces. By using these pre-programmed controls less human effort is required to produce a well-functioning and marketable vehicle service system. Time from design to market is reduced as well, providing a competitive edge. The use of object-oriented technology and language, such as Visual C++, enhances the ability of the software to be maintained and extended.

The system of the present invention uses 32-bit Dynamic Link Libraries (DLL), which reduces memory requirements. These DLLs allow multiple applications to use the same procedure. If running the WindowsNT™ operating system it may run on Intel, MIPS, Alpha, and PowerPC processors. Currently, only Intel is supported for Windows95™. Because of the object-oriented nature of the system of the present invention, porting to other platforms (i.e., UNIX, XENIX, MacOS, etc) may be accomplished in a practical manner. The system of the present invention uses 32-bit Windows graphical user interface metrics wherever appropriate. This allows the system to be set up to accommodate individual operator preferences. The system further utilizes a DCOM OLE 2.0 container and/or object serer to allow the user to drag objects between the system and other windows applications. Because the system supports the Universal Naming Convention (UNC), UNC paths allow logical connections to network devices without the need to specifically reference a network drive letter enabling easy file access across network connections.

In the system of the present invention windows device drivers connect the application layer to the hardware layer of the system via a device independent API. Such a driver device can be, for example, a Virtual Device Driver (VxD) for Windows95™. A kernel mode driver can be utilized with WindowsNT™. With the introduction of Microsoft's Windows Driver Model (WDM) one driver will be able to work for WindowsNT™, Windows95™ or perhaps the latest Microsoft Windows™ product. The advantage of this architecture is that the application layer does not have to change because of underlying hardware changes. Only the device driver will need to be changed to support the new hardware. The device driver provides the same API regardless of hardware type allowing easier changing and interfacing to the present invention system instrument sensor units. Available device driver kits such as those available from Vireo Software can make driver implementation simpler.

The system of the present invention utilizes multitasking in the form of multiple processes and multithreaded code. A process is an executing application that consists of a private virtual address space, code, data and other operating system resources, such as files, pipes and synchronization objects that are visible to the process. A process contains one or more threads that run in the context of the process. A thread is the basic entity to which the operating system allocates CPU time. A thread can execute any part of the application code, including a part simultaneously being executed by another thread. All threads of a process share the virtual address space, global variable and operating system resources of the process. This mechanism creates the effect of simultaneous execution of various parts of the program. The applications are object-oriented and event driven. The multitasking techniques manage multiple activities such as simultaneous sensor communications, user inputs, data manipulations, program state management, and complex visual controls. The advantage of this technique is to handle multiple inputs concurrently providing real time instrumentation. The programs are more efficient and faster by distributing tasks among multiple threads for independent processing.

With the improved 32-bit performance characteristics of the vehicle service system of the present invention, a variety of simultaneous program actions and displays can be achieved. One example is the simultaneous display of both data, such as live measurement gauge readouts, and procedural instructions, such as adjustment steps. In prior known systems and operator had to memorize adjustment instructions or toggle out of a measurement read-out mode to view such instructions while servicing a vehicle. The improvement of the present invention enables both to be viewed simultaneously by combining the instruction screen with the measurement screen. The instruction screen may display still illustrations, video, audio, text, or any combination thereof.

Installing and Uninstalling the 32-bit Software

The installation and unistallation features of the present invention vehicle service system and file integrity checking capability will now be explained.

WindowsNT™ and Windows95™ application software installation is very complex. Among the complexities are the need for components such as DLLs and ActiveX controls to be registered in the operating directory. When multiple applications share resources like DLLs, the registry must be updated to show multiple resource usage so tat when an application is deleted the resource is not removed. ActiveX controls used by the application must be registered in the registry. Means must be provided for the installer to be launched through the ADD/ REMOVE program from the Windows Control Panel. When installing the software the user privilege level must be monitored. The installation processes can be simplified such that a non-skilled person can install vehicle service system software, as described below.

The system of the present invention uses an installer routine to install the software into the desired computer environment. The installer is a graphical setup program which automatically leads the user through the installation process. The installer copies all necessary files from the distribution media onto the desired computer's environment. The installer makes configuration changes, such as registry changes, automatically. The installer installs and registers all required components such as DLLs, ActiveX components, etc. The installer provides means for the software to be installed with the ADD/REMOVE program from within the Windows™ Control Panel. The installer makes use of the operating system's registry to register installed components. The main advantage of the automated installer is that it allows users to self-install the system's software, rather than having an expert technician install the software.

The installer described herein executes in a 32-bit Microsoft Windows™ environment and takes advantage of the CD-ROM autoplay features of Windows95™ and WindowsNT™. When the distribution CD is placed in the CD-ROM drive, the installer routine is automatically prompted for execution. This is accomplished by placing the "AUTORUN.INF" file on the root directory of the CD, which has instructions to execute when the CD is inserted. The AUTORUN.INF file contains the following contents for automatically starting the setup routine.

[autorun]

open=setup

Implementation of the installer can be accomplished by programming in any language, as the program takes advantage of the operating system's application programming interface to accomplish these tasks. This would be time-consuming and would require extensive maintenance as each version of the software is released. A more efficient way to achieve the same effect is to use InstallShield Corporation's product InstallShield™ which visually guides a user through the setup process. The user selects files, DLLs, registry entries, etc. to be installed into the computer's environment. The tool kit then makes an image of the distribution media that is required for installation, which is copied on to the distribution media.

The system of the present invention users a fully automatic uninstaller routine that removes program files, folders and registry entries from the installed environment, except for data files and resources used by other programs. The uninstaller also removes itself. The uninstaller enables an unskilled operator to remove the system's software without inadvertently removing the wrong files and thereby affecting the other Windows™ applications.

Maintaining installed file integrity is accomplished by installing a file integrity check tool. Since software installed on as hard disk drive it is subject to damage by magnetic fields. The file integrity check software will make a record of the installed files consisting of file size, file date, file checksum (addition of all the bytes in the file), CRC (Cyclic Redundancy Check) and similar means of recording file characteristics. The record is saved on a target installation device and backed up on a removable media device. The file integrity check software will use the recorded information to check the integrity of each file. It can be run as a diagnostic tool whenever there is a problem with the installed software, each time the system is started, or any time it is desired.

Figure 3:
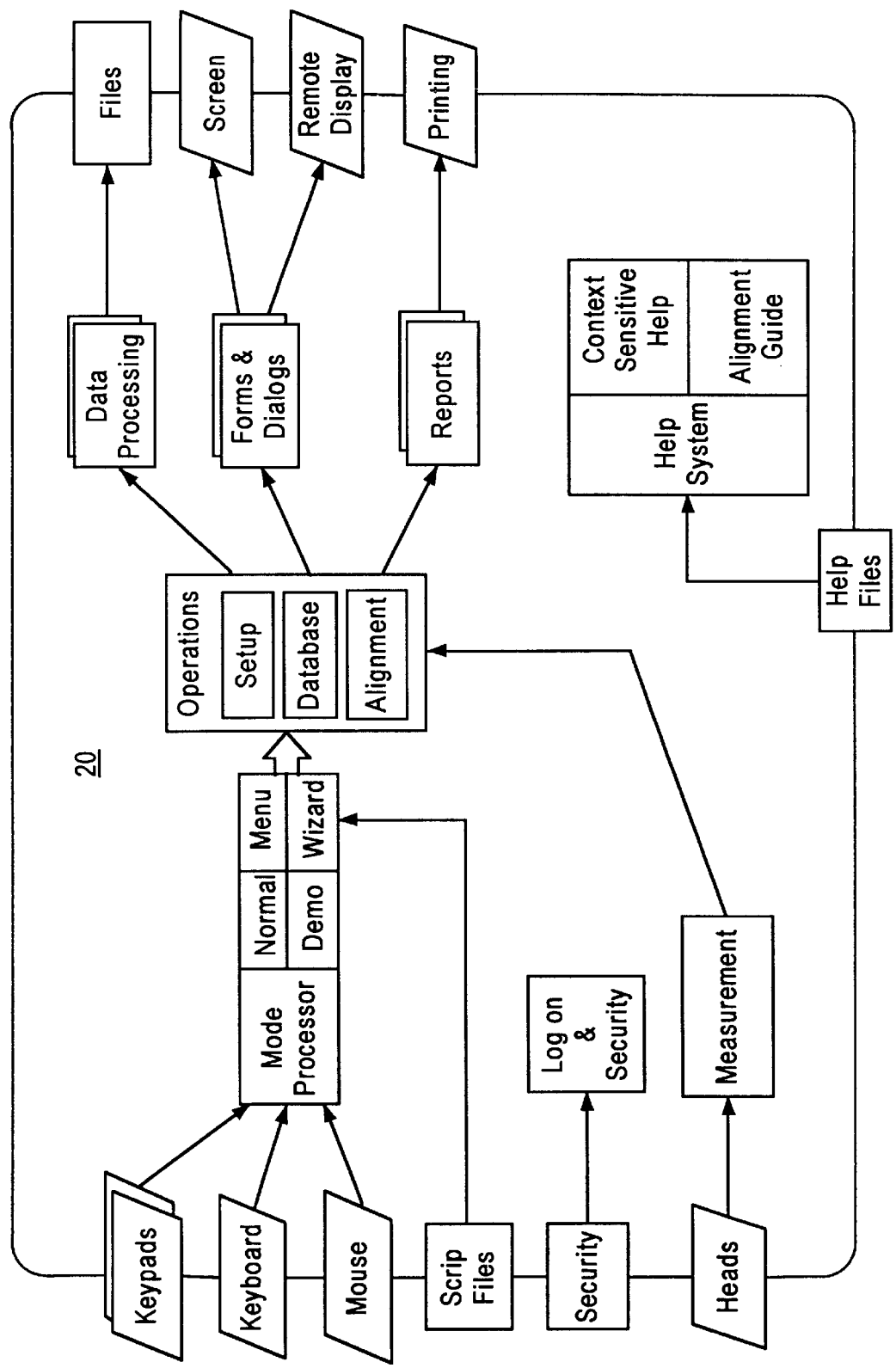
FIG. 3 is a schematic of the navigation framework with process sequence control for the present invention vehicle service system.

Navigational Framework with Process Sequence Control System for 32-Bit Vehicle Service System Another feature of the present invention system is a flexible navigation control (20), as shown in FIG.3, that allows the ability to facilitate process selection for the user so that the user may run the system from either random access or sequential progression. The required processes sometimes need to be activated individually and at other times need to follow a pre-determined sequential progression. In the past, the pre-determined sequence was hard-coded into the software and the end user could not alter it or could only alter it minimally. The present system provides a navigational framework with two modules, the Menu Mode (random) and the Wizard Mode (sequential). The Menus Mode provides direct access to any required process and Wizard Mode provides a flexible control of the process sequences and allows for user modification.

The navigational feature is implemented using C++ programming language following object-oriented design/ programming (OOD/OOP) methods. This technology allows each process to be defined and implemented individually and used as needed in the overall system. Each process is encapsulated and self-contained and can be controlled from the program navigational framework. Navigation is accomplished through a hierarchical menu system using the pointing device, standard keyboard inputs or special keypads. The operator can perform any service process at any time at will. Selections will be restricted only if the operation would produce an inaccurate result.

Figure 4:
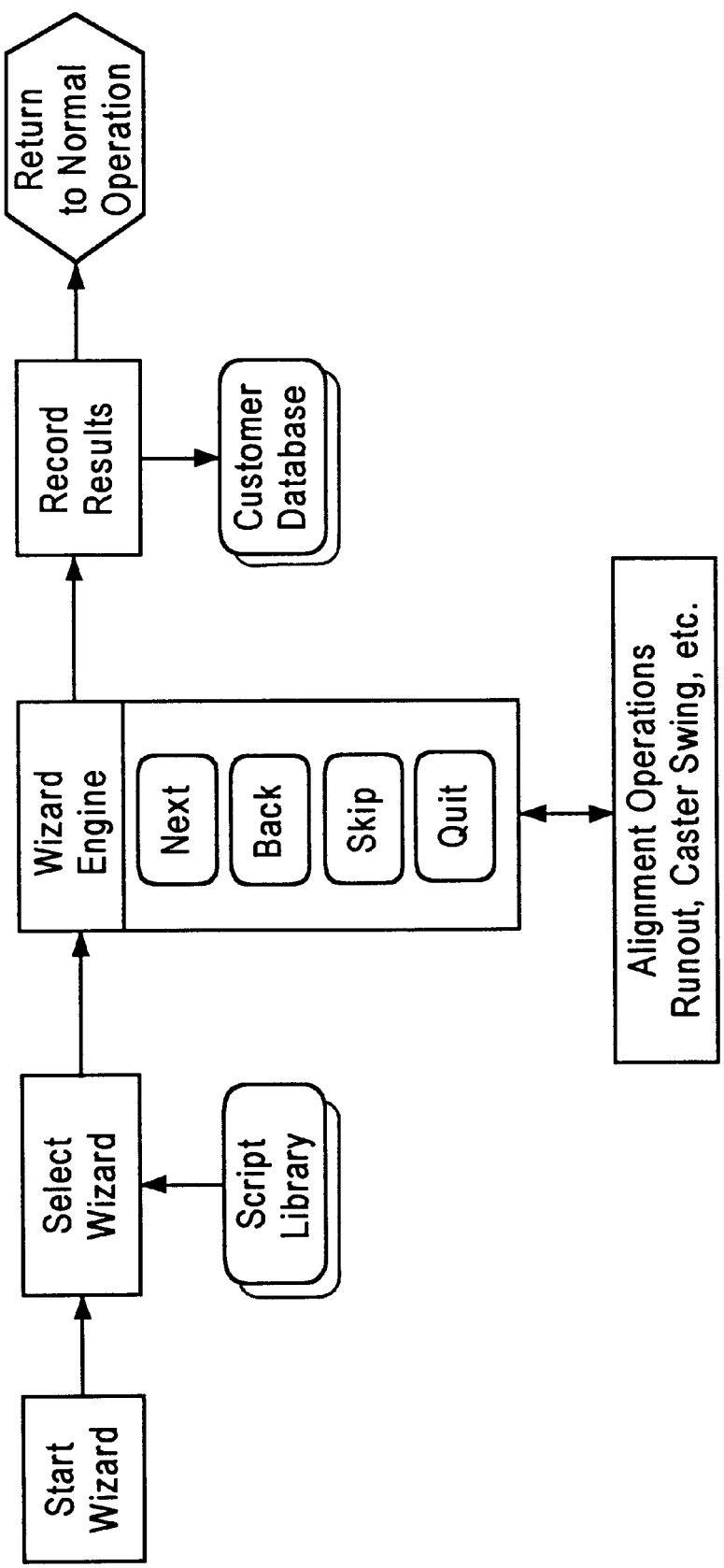
FIG. 4 is a schematic of the wizard setup process sequence control mode of the present invention vehicle service system.

The Wizard Mode, an example of which is illustrated in FIG. 4, is a sequential procedure and is determined by a script or object file. It guides the operator through a vehicle service operation step-by-step. A system can have any number of Wizard procedures. Wizard procedures can be pre-selected, selected by preferences, selected by the operator, keyed to a particular vehicle, keyed to the operator, or any combination of the preceding. Once a Wizard mode is invoked, the steps are determined by the Wizard and the operator input for each step. The Wizard mode enables novice operators to take required steps. The operator can move through a procedure with a minimum of keystrokes, go back and repeat a step, skip a step or abort a procedure. When the Wizard procedure is completed it records the results and returns to the normal operation menu.

A separate Wizard Editor program is used to create and edit the Wizard files. This program provides an easy to use graphical interface with the facility to create, edit, save and view the Wizard files. The operator can select from all available vehicle service equipment processes and insert them into a desired sequence. An end user or service provider can customize the Wizard's step properties for specific conditions.

While the preferred embodiments of the present invention have been herein disclosed and described, it is realized that various modifications can be made to the presently disclosed embodiments without departing from the essence of the presently claimed invention.

We claim:

1. A vehicle service system comprising:

a console computer system; and one or more service systems each including one or more sensors for measuring vehicle characteristics and each adapted to communicate with said console computer system;

wherein said console computer system includes a web server configured for transferring a page containing said vehicle characteristics to a remote computer for display at said remote computer;

wherein said console computer system is configured for providing a navigational framework having a first mode for an operator to select a service process for one of the one or more service systems and a second mode to guide the operator through a vehicle service operation step-by-step;

wherein said console computer system is further configured for allowing the operator to repeat or skip at least one step of the vehicle service operation during the second mode without changing the steps of future vehicle service operations under the second mode.

2. The vehicle service system of claim 1, wherein said browsing request comprises a hypertext transmission protocol (HTTP) request.

3. The vehicle service system of claim 1, wherein one of said plurality of service systems comprises a vehicle wheel alignment system.

4. The vehicle service system of claim 1, wherein the one or more service systems comprise a plurality of the service systems each including one or more sensors for measuring vehicle characteristics and each adapted to communicate with said console computer system; and wherein said console computer system is further configured to operate on a 32-bit operating system for providing concurrent handing of multiple inputs of the vehicle characteristics from the plurality of service systems and display of data relating to the vehicle characteristics.

5. A vehicle service system, comprising:

a console computer system; and a plurality of service systems each including one or more sensors for measuring vehicle characteristics and each adapted to communicate with said console computer system;

wherein said console computer system is configured for providing a navigational framework having a first mode for an operator to select a service process for one of the service systems and a second mode to guide the operator through a vehicle service operation step-by-steps wherein said console computer system is further configured for allowing the operator to repeat or skip at least one step of the vehicle service operation during the second mode without changing the steps of future vehicle service operations under the second mode.

6. The system of claim 5, wherein said console computer system includes a web server for accessing a computer that is remote to the service site, said web server configured for enabling transfer of information relating to display of said vehicle characteristics between said console computer system and said remote computer.

7. The system of claim 5, wherein said console computer system is further configured to operate on a 32-bit operating system for providing concurrent handing of multiple inputs of the vehicle characteristics from the service systems and display of data relating to the vehicle characteristics.

* * * * *